(12) United States Patent
Kim

(10) Patent No.: US 10,557,546 B2
(45) Date of Patent: Feb. 11, 2020

(54) CONTROL APPARATUS AND CONTROL METHOD FOR VEHICLE

(71) Applicant: HYUNDAI DYMOS INCORPORATED, Seosan-si, Chungcheongnam-do (KR)

(72) Inventor: Dae kyun Kim, Hwaseong-si (KR)

(73) Assignee: HYUNDAI TRANSYS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 16/193,494

(22) Filed: Nov. 16, 2018

(65) Prior Publication Data

US 2019/0186628 A1 Jun. 20, 2019

(30) Foreign Application Priority Data

Dec. 18, 2017 (KR) .......................... 10-2017-0174254

(51) Int. Cl.
| | |
|---|---|
| F16H 61/02 | (2006.01) |
| F16H 59/44 | (2006.01) |
| F16H 59/68 | (2006.01) |
| F16H 59/70 | (2006.01) |
| F16H 59/58 | (2006.01) |

(52) U.S. Cl.
CPC .......... *F16H 61/0213* (2013.01); *F16H 59/44* (2013.01); *F16H 59/58* (2013.01); *F16H 59/70* (2013.01); *F16H 2059/6807* (2013.01)

(58) Field of Classification Search
CPC .......... F16H 59/44; F16H 59/58; F16H 59/70; F16H 2061/009; F16H 2061/0216; F16H 61/0204; F16H 2300/02; F16H 2342/00
See application file for complete search history.

(56) References Cited

U.S. PATENT DOCUMENTS

| | | | | |
|---|---|---|---|---|
| 4,584,907 A * | 4/1986 | Niwa | .................... | B04B 5/0421 477/46 |
| 5,341,703 A * | 8/1994 | Palansky | ............. | F16H 61/0213 477/120 |
| 5,704,695 A * | 1/1998 | Monzaki | ................. | B60T 8/172 303/146 |
| 2005/0119805 A1* | 6/2005 | Bischoff | .................. | B60K 6/48 701/22 |
| 2016/0033039 A1* | 2/2016 | Yamasaki | ............... | F16H 59/70 477/107 |

* cited by examiner

Primary Examiner — Edwin A Young
(74) Attorney, Agent, or Firm — Novick, Kim & Lee, PLLC; Jae Youn Kim

(57) ABSTRACT

Provided are a control apparatus and a control method for a vehicle capable of automatically storing transmission control data corresponding to a transmission after the transmission is installed. The control apparatus for the vehicle includes a speed sensor for measuring the actual driving speed of a vehicle; a memory unit for storing first final reduction gear ratio data and second final reduction gear ratio data; and a control unit for setting a final reduction gear ratio corresponding to an installed transmission by comparing a difference between the actual driving speed of the vehicle received from the speed sensor and the driving speed of the vehicle calculated through a first final reduction gear ratio with a difference between the actual driving speed of the vehicle and the driving speed of the vehicle calculated through a second final reduction gear ratio.

11 Claims, 3 Drawing Sheets

CONTROL APPARATUS AND CONTROL METHOD FOR VEHICLE

CROSS-REFERENCE TO RELATED APPLICATIONS

The instant application claims priority to Korean patent application No. 10-2017-0174254 filed on Dec. 18, 2017, the entire disclosure of which is hereby incorporated by reference.

BACKGROUND OF THE DISCLOSURE

Field of the Disclosure

The present disclosure relates to a control apparatus and a control method for a vehicle, and more particularly, to a control apparatus and a control method for a vehicle capable of automatically storing transmission control data corresponding to a transmission after the transmission is installed therein.

Description of the Related Art

Generally, an automatic transmission for a vehicle is separately provided with a transmission control unit for controlling it in correspondence to the specification thereof, and accordingly, the transmission control unit should be installed together when a transmission is installed.

Herein, the transmission control unit performs a driving test on performance, characteristics, etc. of the vehicle several times in the producing company when producing a control device for controlling the automatic transmission for the vehicle, and the shift of the automatic transmission is programmed and stored to be performed without the shift shock according to a signal that is outputted from a sensing device of each vehicle.

Accordingly, when the automatic transmission is assembled in the production line of the vehicle or the transmission is replaced in the maintenance shop, the transmission control unit corresponding to the specification of the installed transmission should be separately installed or replaced.

However, there is a problem in that the transmission control unit is provided separately as in the convention and accordingly, the transmission control unit corresponding to the specification of the installed transmission after the transmission is installed should be additionally installed, thus increasing the cost and taking additional processing time.

In addition, there is a problem in that when an operator erroneously installs the transmission control unit of different specification, the transmission control unit should be replaced again, thus taking a lot of process time.

SUMMARY OF THE DISCLOSURE

The present disclosure is intended to solve the above problems, and an object of the present disclosure is to provide a control apparatus and a control method for a vehicle capable of automatically selecting and then storing transmission control data corresponding to an installed transmission.

A control apparatus for a vehicle in accordance with a preferred embodiment of the present disclosure for achieving the object includes a speed sensor for measuring the actual driving speed of a vehicle; a memory unit for storing first final reduction gear ratio data and second final reduction gear ratio data; and a control unit for setting a final reduction gear ratio corresponding to an installed transmission by comparing a difference between the actual driving speed of the vehicle received from the speed sensor and the driving speed of the vehicle calculated through a first final reduction gear ratio with a difference between the actual driving speed of the vehicle and the driving speed of the vehicle calculated through a second final reduction gear ratio.

The control unit can store the first final reduction gear ratio data in a transmission control unit, maintain the stored state when the following equation is satisfied, and replace it with the second final reduction gear ratio data to store it therein when the following equation is not satisfied.

$$|A-C| \le |B-C|$$

Herein, the A refers to the driving speed of the vehicle calculated in the state to which the first final reduction gear ratio has been applied, the B to the driving speed of the vehicle calculated in the state to which the second final reduction gear ratio has been applied, and the C to the actual driving speed of the vehicle measured through the speed sensor.

Then, the control apparatus for the vehicle in accordance with an embodiment of the present disclosure further includes a shift sensing sensor for sensing whether or not the shift has been performed in the transmission, and an angle sensor for measuring a rotation angle of a steering; and the control unit can determine whether or not to satisfy the equation in the state that the transmission is shifted at least once, the measured actual driving speed of the vehicle exceeds 30 km/h, and the rotation angle of the steering is less than 1°.

Then, the control unit can store the first final reduction gear ratio data or the second final reduction gear ratio data in the transmission control unit only when the time that satisfies the equation or the time that does not satisfy the equation is maintained for at least 3 seconds or more.

In addition, the memory unit can store first transmission data for controlling the transmission in correspondence to the first final reduction gear ratio and second transmission data for controlling the transmission in correspondence to the second final reduction gear ratio, and the control unit can store the first transmission data or the second transmission data together in the transmission control unit when storing the first final reduction gear ratio data or the second final reduction gear ratio data therein.

Then, a control method for a vehicle in accordance with a preferred embodiment of the present disclosure for achieving the object includes inputting first final reduction gear ratio data stored in a memory unit to a transmission control unit when a vehicle is started; driving the vehicle so that the rotation angle of a steering is less than 1° and the actual driving speed of the vehicle exceeds 30 km/h; and setting a final reduction gear ratio corresponding to an installed transmission by comparing a difference between the actual driving speed of the vehicle and the driving speed of the vehicle calculated through a first final reduction gear ratio with a difference between the actual driving speed of the vehicle and the driving speed of the vehicle calculated through a second final reduction gear ratio.

Herein, the setting the final reduction gear ratio can confirm whether or not to satisfy the following equation to store the first final reduction gear ratio data or the second final reduction gear ratio data that have been stored in the memory unit in the transmission control unit.

$$|A-C| \le |B-C|$$

Herein, the A refers to the driving speed of the vehicle calculated in the state to which the first final reduction gear ratio has been applied, the B to the driving speed of the vehicle calculated in the state to which the second final reduction gear ratio has been applied, and the C to the actual driving speed of the vehicle measured through a speed sensor.

Then, the setting the final reduction gear ratio can maintain the state that the first final reduction gear ratio data have been stored in the transmission control unit when maintaining the state satisfying the equation for 3 seconds or more.

In addition, the setting the final reduction gear ratio can store first transmission data for controlling the transmission in correspondence to the first final reduction gear ratio in the transmission control unit.

In addition, the setting the final reduction gear ratio can replace the first final reduction gear ratio data stored in the transmission control unit with the second final reduction gear ratio data to store it therein when the state that does not satisfy the equation is maintained for 3 seconds or more.

In addition, the setting the final reduction gear ratio can store second transmission data for controlling the transmission in correspondence to the second final reduction gear ratio in the transmission control unit.

According to the control apparatus and the control method for the vehicle in accordance with the present disclosure, it is possible to automatically store the transmission control data corresponding to the installed transmission when the transmission is installed in the production line, or by the replacement, etc., thus saving the operation time.

Then, according to the present disclosure, it is unnecessary to separately install or replace the transmission control unit in which the data for controlling the installed transmission have been stored, thus reducing the production cost.

DESCRIPTION OF SPECIFIC EMBODIMENTS

Figure 1:
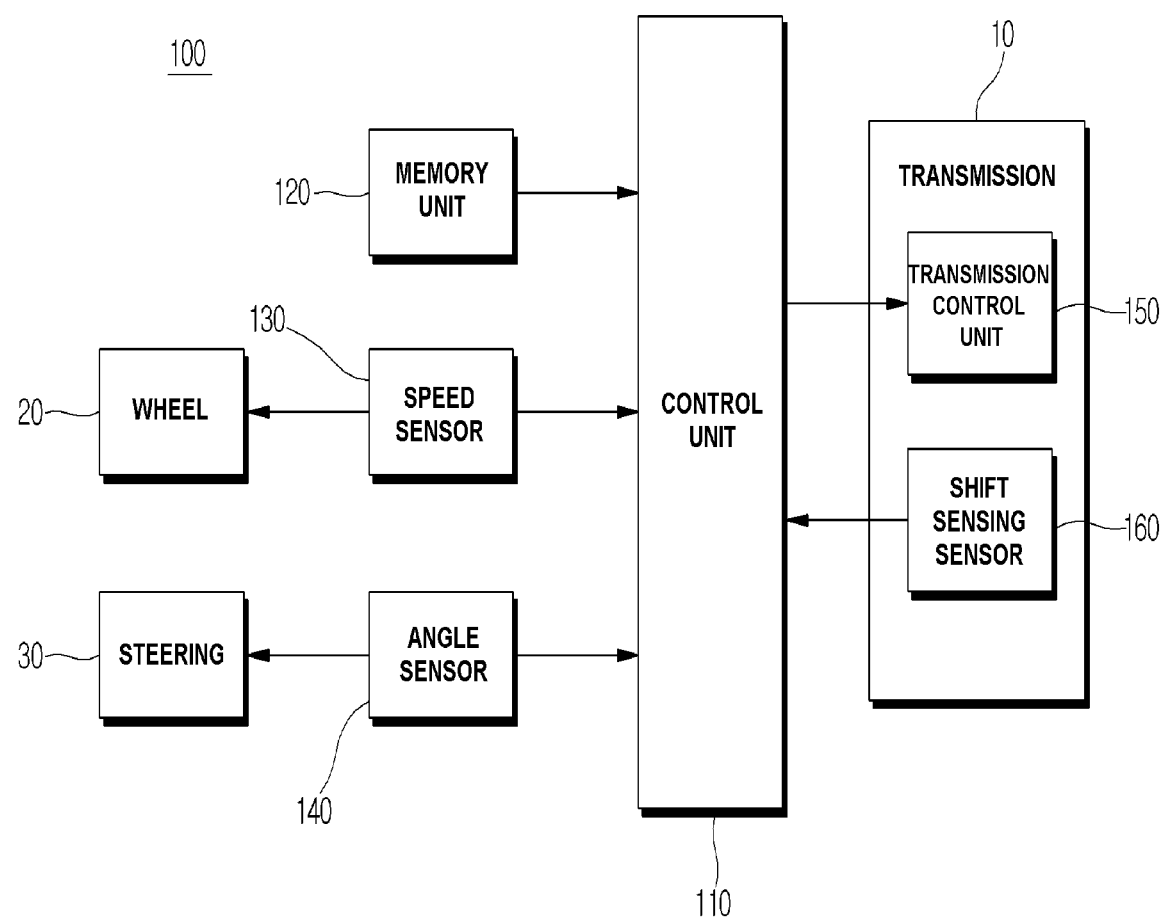
FIG. 1 is a block diagram schematically illustrating a control apparatus for a vehicle in accordance with an embodiment of the present disclosure.

In order to facilitate understanding of the features of the present disclosure, a control apparatus and a control method for a vehicle in accordance with an embodiment of the present disclosure will be described in more detail.

It should be noted that in denoting reference numerals to the elements in each accompanying drawing in order to facilitate understanding of the embodiments described below, the same elements have the same reference numerals if possible even though illustrated in different drawings. In addition, in explaining the present disclosure, detailed description of related known configurations or functions will be omitted if it obscures the subject matter of the present disclosure.

Hereinafter, a specific embodiment of the present disclosure will be described with reference to the accompanying drawings.

FIG. 1 is a block diagram schematically illustrating a control apparatus for a vehicle in accordance with an embodiment of the present disclosure.

Referring to FIG. 1, a control apparatus for a vehicle 100 in accordance with an embodiment of the present disclosure includes a speed sensor 130 for measuring the actual driving speed of a vehicle, a memory unit 120 for storing a first final reduction gear ratio data and a second final reduction gear ratio data, and a control unit 110 for setting a final reduction gear ratio corresponding to an installed transmission 10 by comparing a difference between the actual driving speed of the vehicle received from the speed sensor 130 and the driving speeds of the vehicle calculated through a first final reduction gear ratio and a second final reduction gear ratio.

That is, the control apparatus for the vehicle 100 can drive the vehicle by inputting the first final reduction gear ratio data to a transmission control unit 150 of the transmission 10, confirm a final reduction gear ratio suitable for the installed transmission 10 by comparing a difference between the actual driving speed of the vehicle measured through the speed sensor 130 and the driving speed of the vehicle calculated through the first final reduction gear ratio with a difference between the measured actual driving speed of the vehicle and the driving speed of the vehicle calculated through the second final reduction gear ratio, and set a final reduction gear ratio in correspondence to the transmission 10 automatically installed through the driving of the vehicle by being provided to store selected final reduction gear ratio data in the transmission control unit 150.

The speed sensor 130 is a sensor for measuring the actual driving speed of the vehicle, and can be provided to measure the RPM of a wheel 20 for the vehicle to confirm the actual driving speed of the vehicle. Of course, the method for measuring the actual driving speed of the vehicle is not limited thereto, and various known measuring methods capable of measuring the actual driving speed of the vehicle can be applied thereto.

The memory unit 120 stores various final reduction gear ratio data corresponding to the specification of the transmission 10, and transmission control data necessary for controlling the transmission 10 in advance.

Accordingly, the control unit 110 inputs the final reduction gear ratio data stored in the memory unit 120 to the transmission control unit 150 of the installed transmission 10 to store the final reduction gear ratio data suitable for the installed transmission 10 and the transmission control data through the result data obtained after driving in the transmission control unit 150.

For example, the memory unit 120 stores first transmission control data that can control the transmission 10 in correspondence to the first final reduction gear ratio data and the first final reduction gear ratio and second transmission control data that can control the transmission 10 in correspondence to the second final reduction gear ratio data and the second final reduction gear ratio.

The control unit 110 inputs the first final reduction gear ratio data to the transmission control unit 150 to drive the vehicle, and sets a final reduction gear ratio suitable for the installed transmission 10 by comparing a difference between the actual driving speed of the vehicle measured through the speed sensor 130 and the driving speed of the vehicle calculated through the first final reduction gear ratio with a difference between the actual driving speed of the vehicle and the driving speed of the vehicle calculated through the second final reduction gear ratio.

More specifically, the control unit 110 stores the first final reduction gear ratio data in the transmission control unit 150, maintains the stored state when the following equation is satisfied, and replaces it with the second final reduction gear ratio to store it therein when the following equation is not satisfied.

$$|A-C| \le |B-C|$$

Herein, the A refers to the driving speed of the vehicle calculated in the state to which the first final reduction gear ratio has been applied, the B to the driving speed of the vehicle calculated in the state to which the second final reduction gear ratio has been applied, and the C to the actual driving speed of the vehicle measured through the speed sensor.

Referring to the equation, when the final reduction gear ratio suitable for the installed transmission 10 corresponds to the first final reduction gear ratio initially stored, the driving speed of the vehicle A calculated in the state to which the first final reduction gear ratio has been applied almost coincides with the actual driving speed of the vehicle C, such that the left side in the equation is close to 0, and the driving speed of the vehicle B calculated in the state to which the second final reduction gear ratio has been applied does not correspond to the installed transmission 10 to thereby occur an error with the actual driving speed of the vehicle C, such that the left side therein becomes smaller than the right side therein.

When the result value shows that the left side therein is greater than the right side therein, the first final reduction gear ratio initially stored is a value that is not suitable for the installed transmission 10, such that it is determined that the second final reduction gear ratio is a value that is suitable for the installed transmission 10.

Then, in order to more accurately select the final reduction gear ratio suitable for the installed transmission 10, a certain condition should be satisfied.

For this purpose, the control apparatus for the vehicle 100 in accordance with an embodiment of the present disclosure further includes a shift sensing sensor 160 for sensing whether or not the shift has been performed in the transmission 10, and an angle sensor 140 for measuring the rotation angle of a steering 30.

Accordingly, the control unit 110 determines whether or not to satisfy the equation in the state that the transmission 10 is shifted at least once, the measured actual driving speed of the vehicle exceeds 30 km/h, and the rotation angle of the steering 30 is less than 1°.

The condition is a minimum condition for confirming a driving error that can occur in the vehicle due to the error of the final reduction gear ratio stored in the transmission control unit 150. That is, the transmission 10 should be operated; the error of the actual driving speed due to the error of the final reduction gear ratio at a low speed is not large, such that the actual driving speed should exceed 30 km/h so that the error of the driving speed due to the error of the final reduction gear ratio can be confirmed; and the resistance according to the rotation of the vehicle affects confirming an accurate driving speed, such that it can be confirmed more accurately by going straight ahead.

In addition, the equation can be instantaneously satisfied under the condition, such that it is preferable to select the final reduction gear ratio only when the time that satisfies or does not satisfy the equation is maintained for at least 3 seconds or more for more accurate determination.

Accordingly, the control unit 110 stores the first final reduction gear ratio data or the second final reduction gear ratio data in the transmission control unit 150 only when the time that satisfies the equation or the time that does not satisfy the equation is maintained for at least 3 seconds or more.

In addition, the memory unit 120 stores first transmission data for controlling the transmission in correspondence to the first final reduction gear ratio and second transmission data for controlling the transmission in correspondence to the second final reduction gear ratio, such that the control unit 110 stores the first transmission data or the second transmission data together in the transmission control unit 150 when storing the first final reduction gear ratio data or the second final reduction gear ratio data therein.

Herein, the control unit 110 can be provided with an Electronic Control Unit (ECU) for the vehicle, and the memory unit 120 can utilize a memory unit provided in the Electronic Control Unit for the vehicle.

According to this configuration, when the transmission 10 is newly installed in the vehicle, it is possible to automatically select and store the final reduction gear ratio suitable for the installed transmission 10 through the driving of the vehicle under a certain condition and through the above, to store the transmission control data for controlling the installed transmission 10 together therein, thus saving the cost and the processing time because it is unnecessary to separately install the transmission control unit 150 in which the data for controlling the transmission 10 have been stored.

Figure 2:
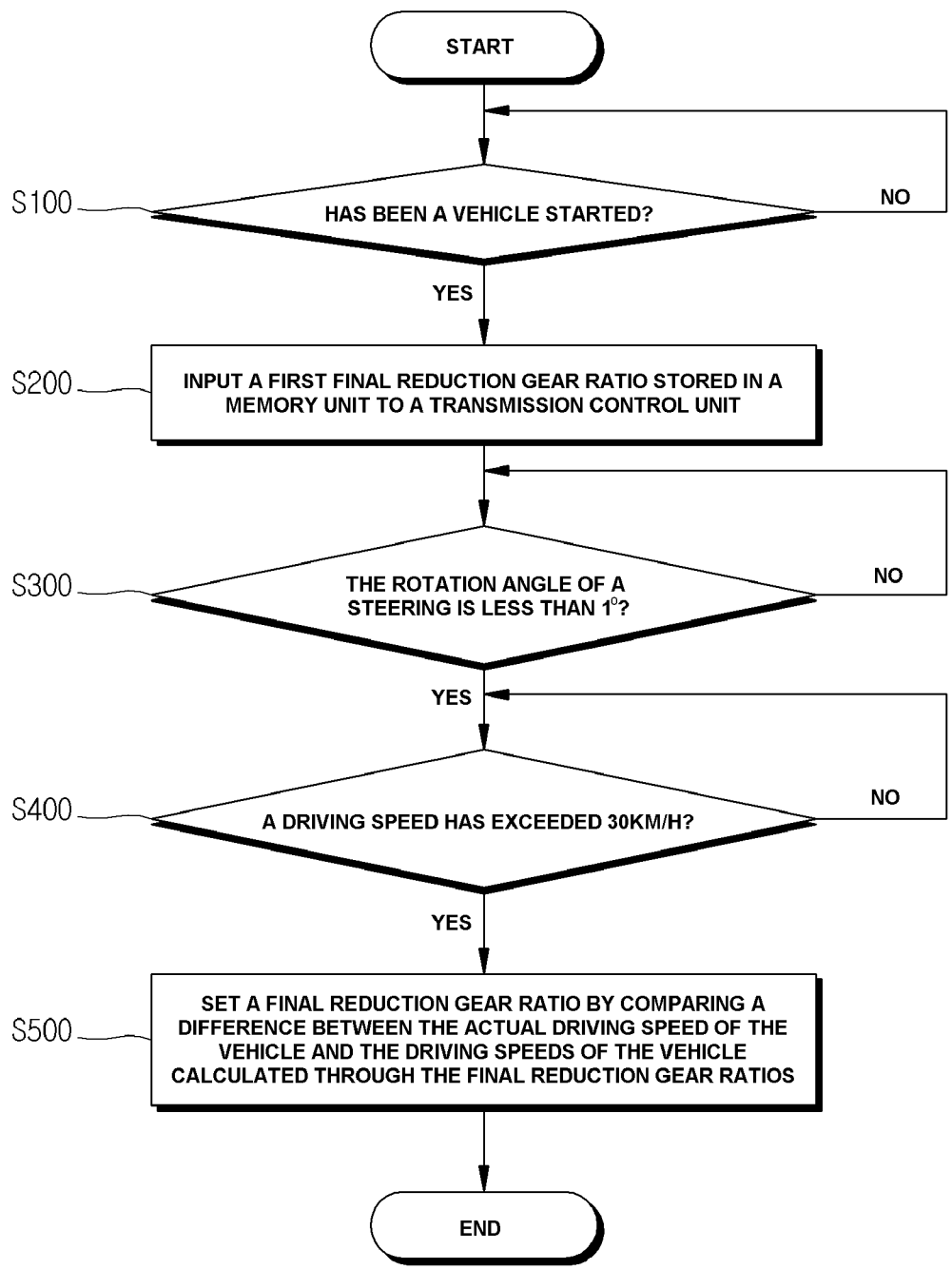
FIG. 2 is a flowchart schematically illustrating a control method for a vehicle in accordance with an embodiment of the present disclosure.
Figure 3:
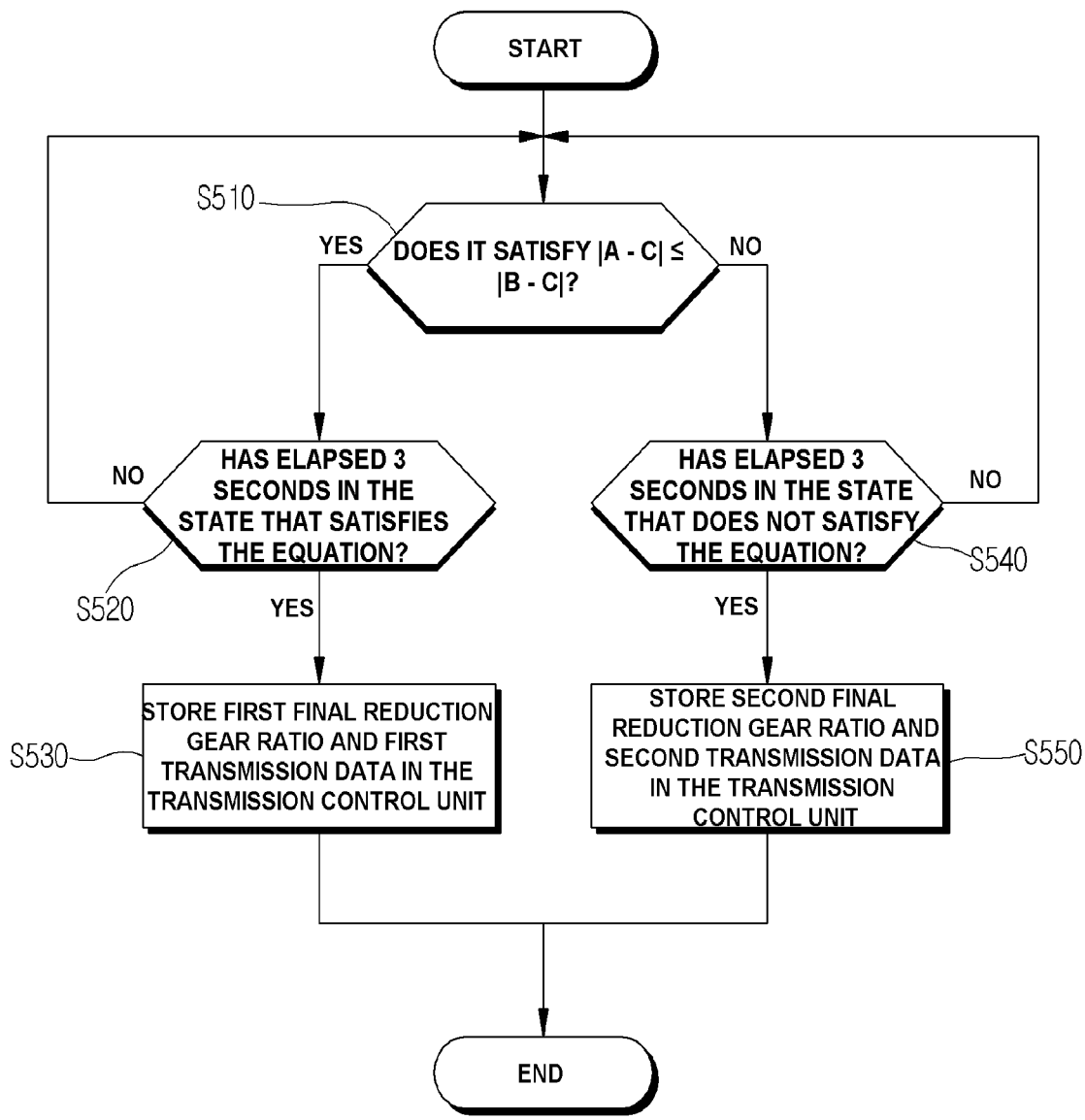
FIG. 3 is a flowchart schematically illustrating setting a final reduction gear ratio in the control method for the vehicle in accordance with an embodiment of the present disclosure.

FIG. 2 is a flowchart schematically illustrating a control method for a vehicle in accordance with an embodiment of the present disclosure, and FIG. 3 is a flowchart schematically illustrating setting a final reduction gear ratio in the control method for the vehicle.

Referring to FIGS. 2 and 3, a control method for a vehicle in accordance with an embodiment of the present disclosure includes inputting first final reduction gear ratio data stored in a memory unit to a transmission control unit S200 when the vehicle is started (Yes in S100), driving the vehicle so that the rotation angle of a steering is less than 1° (Yes in S300) and the actual driving speed of the vehicle exceeds 30 km/h (Yes in S400), and setting a final reduction gear ratio corresponding to an installed transmission by comparing a difference between the actual driving speed of the vehicle and the driving speeds of the vehicle calculated through the first final reduction gear ratio and the second final reduction gear ratio S500.

That is, the setting the final reduction gear ratio S500 sets a final reduction gear ratio corresponding to the installed transmission from the result that compares a difference between the actual driving speed of the vehicle and the driving speed of the vehicle calculated through the first final reduction gear ratio with a difference between the actual driving speed of the vehicle and the driving speed of the vehicle calculated through the second final reduction gear ratio.

More specifically, the setting the final reduction gear ratio S500 confirms whether or not to satisfy the following equation to store the first final reduction gear ratio data or the second final reduction gear ratio data that have been stored in the memory unit in the transmission control unit.

$$|A-C| \le |B-C|$$

Herein, the A refers to the driving speed of the vehicle calculated in the state to which the first final reduction gear ratio has been applied, the B to the driving speed of the vehicle calculated in the state to which the second final reduction gear ratio has been applied, and the C to the actual driving speed of the vehicle measured through a speed sensor.

Then, the setting the final reduction gear ratio S500 confirms whether or not to satisfy the equation, and maintains the state that the first final reduction gear ratio data have been stored in the transmission control unit when maintaining the state satisfying the equation (YES in S510) for 3 seconds or more, that is, stores the first final reduction gear ratio data in the transmission control unit S530. In addition, it stores first transmission data for controlling the transmission in correspondence to the first final reduction gear ratio together in the transmission control unit S530.

In addition, the setting the final reduction gear ratio S500 confirms whether or not to satisfy the equation, and replaces the first final reduction gear ratio data stored in the transmission control unit with the second final reduction gear ratio data to store it therein S550 when the state that does not satisfy the equation (No in S510) is maintained for 3 seconds or more (Yes in S540). In addition, it stores second transmission data for controlling the transmission in correspondence to the second final reduction gear ratio together in the transmission control unit S550.

According to the control method, when the transmission is newly installed in the vehicle, it is possible to automatically select and store the final reduction gear ratio suitable for the installed transmission through the driving of the vehicle under a certain condition, and through the above, to store the transmission control data for controlling the installed transmission together therein, thus saving the cost and the processing time because it is unnecessary to separately install the transmission control unit in which the data for controlling the transmission have been stored.

As described above, while the present disclosure has been described with respect to the specific embodiments and drawings, it will be apparent that the present disclosure is not limited thereto, and various modifications and deformations thereof can be made by those skilled in the art within the technical spirit and equivalent scope of the appended claims of the present disclosure.

What is claimed is:

1. A control apparatus for a vehicle, comprising:
a speed sensor for measuring an actual driving speed of the vehicle;
a memory unit for storing first final reduction gear ratio data and second final reduction gear ratio data; and
a control unit for setting a final reduction gear ratio corresponding to an installed transmission by comparing a difference between the actual driving speed of the vehicle received from the speed sensor and a driving speed of the vehicle calculated through a first final reduction gear ratio with a difference between the actual driving speed of the vehicle and a driving speed of the vehicle calculated through a second final reduction gear ratio.

2. The control apparatus for the vehicle of claim 1,
wherein the control unit stores the first final reduction gear ratio data in a transmission control unit, maintains the stored first final reduction gear ratio data when the following equation is satisfied, and replaces it with the second final reduction gear ratio data when the following equation is not satisfied, $$|A-C| \le |B-C|$$

wherein A refers to the driving speed of the vehicle calculated in a state to which the first final reduction gear ratio has been applied, B refers to the driving speed of the vehicle calculated in another state to which the second final reduction gear ratio has been applied, and C refers to the actual driving speed of the vehicle measured through the speed sensor.

3. The control apparatus for the vehicle of claim 2, further comprising
a shift sensing sensor for sensing whether or not a shift has been performed in the transmission; and
an angle sensor for measuring a rotation angle of steering,
wherein the control unit determines whether or not to satisfy the equation in a state that the transmission is shifted at least once, the measured actual driving speed of the vehicle exceeds 30 km/h, and the rotation angle of steering is less than 1°.

4. The control apparatus for the vehicle of claim 2,
wherein the control unit stores the first final reduction gear ratio data or the second final reduction gear ratio data in the transmission control unit only when a time that satisfies the equation or a time that does not satisfy the equation is maintained for at least 3 seconds or more.

5. The control apparatus for the vehicle of claim 2,
wherein the memory unit stores first transmission data for controlling the transmission in correspondence to the first final reduction gear ratio and second transmission data for controlling the transmission in correspondence to the second final reduction gear ratio, and
wherein the control unit stores the first transmission data or the second transmission data together in the transmission control unit when storing the first final reduction gear ratio data or the second final reduction gear ratio data therein.

6. A control method for a vehicle, comprising:
inputting first final reduction gear ratio data stored in a memory unit to a transmission control unit when the vehicle is started;
driving the vehicle so that a rotation angle of steering is less than 1° and an actual driving speed of the vehicle exceeds 30 km/h; and
setting a final reduction gear ratio corresponding to an installed transmission by comparing a difference between the actual driving speed of the vehicle and a driving speed of the vehicle calculated through a first final reduction gear ratio with a difference between the actual driving speed of the vehicle and a driving speed of the vehicle calculated through a second final reduction gear ratio.

7. The control method for the vehicle of claim 6,
wherein the setting of the final reduction gear ratio includes confirming whether or not to satisfy the following equation to store the first final reduction gear ratio data or the second final reduction gear ratio data that have been stored in the memory unit in the transmission control unit, $$|A-C| \le |B-C|$$

wherein A refers to the driving speed of the vehicle calculated in a state to which the first final reduction gear ratio has been applied, B refers to the driving speed of the vehicle calculated in another state to which the second final reduction gear ratio has been applied, and C refers to the actual driving speed of the vehicle measured through a speed sensor.

8. The control method for the vehicle of claim 7,
wherein the setting of the final reduction gear ratio further includes maintaining the state that the first final reduction gear ratio data have been stored in the transmission control unit when maintaining the state satisfying the equation for 3 seconds or more.

9. The control method for the vehicle of claim 8,
wherein the setting of the final reduction gear ratio further includes storing first transmission data for controlling the transmission in correspondence to the first final reduction gear ratio in the transmission control unit.

10. The control method for the vehicle of claim 7,
wherein the setting of the final reduction gear ratio further includes replacing the first final reduction gear ratio data stored in the transmission control unit with the second final reduction gear ratio data when a state that does not satisfy the equation is maintained for 3 seconds or more.

11. The control method for the vehicle of claim 10,
wherein the setting of the final reduction gear ratio further includes storing second transmission data for controlling the transmission in correspondence to the second final reduction gear ratio in the transmission control unit.

\* \* \* \* \*